United States Patent [19]

Moriconi et al.

[11] 4,232,256
[45] Nov. 4, 1980

[54] UNITARY ELECTRIC MOTOR AND BI-DIRECTIONAL CONTROLLER ARRANGEMENT

[75] Inventors: Leonard E. Moriconi, Southfield; Yoshitaka Yoshida, Warren, both of Mich.

[73] Assignee: General Motors Corporation, Detroit, Mich.

[21] Appl. No.: 946,503

[22] Filed: Sep. 28, 1978

[51] Int. Cl.³ .............................................. H02P 3/00
[52] U.S. Cl. ..................................... 318/292; 318/541
[58] Field of Search ............... 318/541, 291, 292, 293; 310/229, 230, 241, 231, 219

[56] References Cited

U.S. PATENT DOCUMENTS

| | | | |
|---|---|---|---|
| 1,557,221 | 10/1925 | Van Rennes | 318/292 |
| 2,336,562 | 12/1943 | Nardone | 318/292 |
| 2,350,740 | 6/1944 | Fischer | 318/293 |
| 2,416,166 | 2/1947 | Farrow, Jr. | 318/293 |
| 2,500,571 | 3/1950 | Reynolds | 318/292 |
| 2,581,166 | 1/1952 | Bonanno et al. | 318/293 |
| 3,875,495 | 4/1975 | Middlebrook | 310/230 |

Primary Examiner—David Smith, Jr.
Attorney, Agent, or Firm—Richard G. Stahr

[57] ABSTRACT

An electrically energizable device of the type that may be selectively rotated through first and second angles of rotation in respective opposite directions in response to the electrical energization thereof in respective opposite senses supports and oscillates a disc member having two discrete circumferentially disposed electrically conductive areas separated by two discrete electrically insulating areas. This device is mounted upon the housing of an electrical motor in such a manner that the disc member is in axial alignment with the motor armature with a surface of each of the motor brushes being in sliding engagement with a surface of the disc member and in contact with a respective one of the electrically insulating areas when the disc member is in a neutral position. Electrical energization of the motor armature may be effected in respective opposite senses in response to the operation of the disc member through the first angle of rotation and through the second angle of rotation.

3 Claims, 5 Drawing Figures

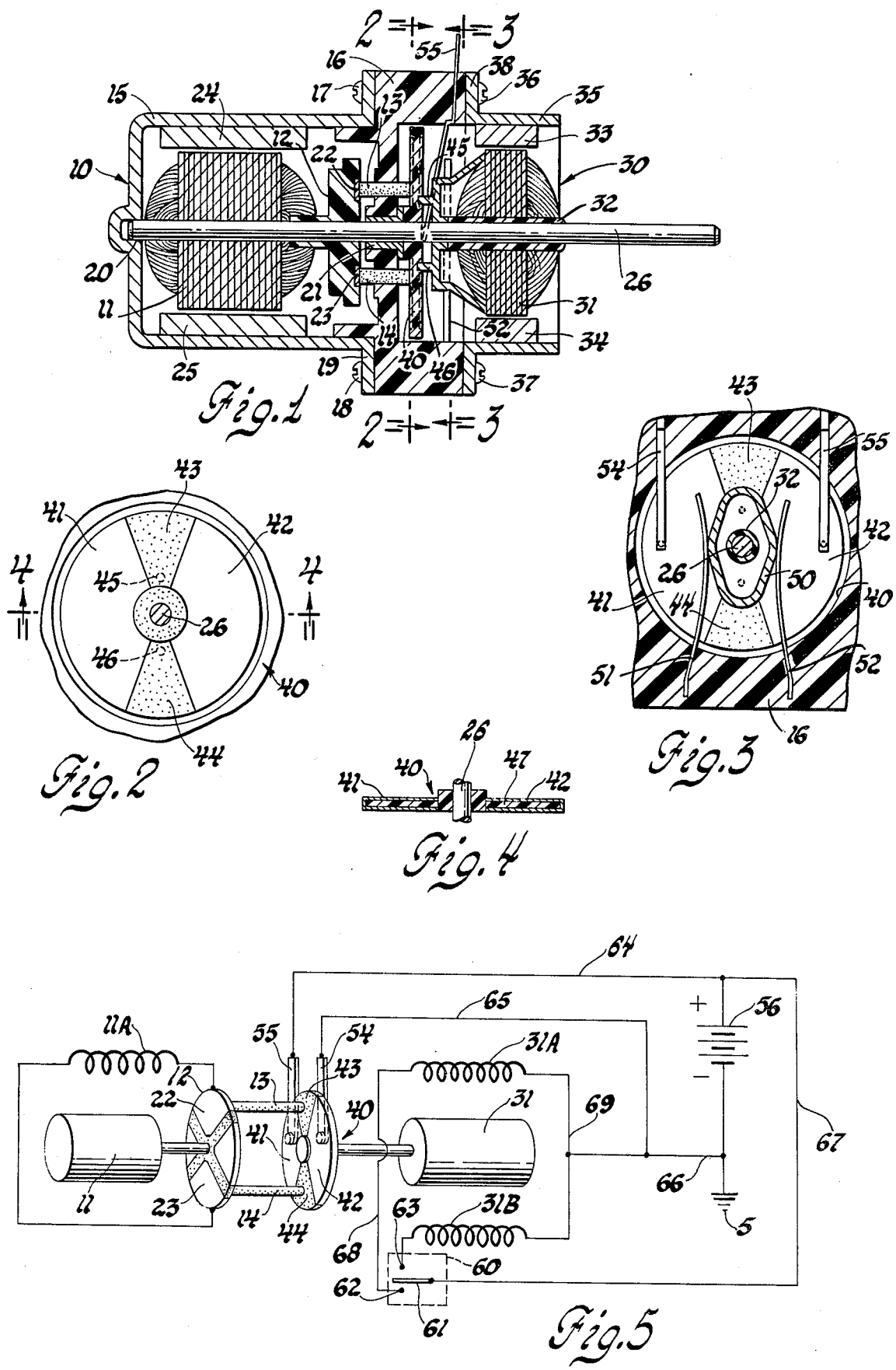

UNITARY ELECTRIC MOTOR AND BI-DIRECTIONAL CONTROLLER ARRANGEMENT

This invention is directed to an electric motor bi-directional control system and, more specifically, to a unitary electric motor and bi-directional controller arrangement.

Modern electronically operated systems require an interface between an electronic control module and a high-power actuator device such as an automotive window lift motor or door lock motor. The presently available electronic control systems are impractical with automotive applications because of the lack of a reliable, inexpensive and small volume interface between the control modules and the high-power actuators. This problem is compounded by the fact that permanent magnet motors that require bi-directional electrical power application to the armature winding have become a common source of actuator power. The most commonly used prior art electronic module-power actuator interface has been an electrical relay which is relatively large, is position sensitive and is susceptible to contact bounce. An investigation of various switching applications revealed that electrically operable sliding contacts packaged in the same housing as the power actuator unit provides the most suitable electronic control module-power actuator unit interface.

It is, therefore, an object of this invention to provide an improved unitary electric motor and bi-directional controller arrangement.

It is another object of this invention to provide an improved unitary electric motor and bi-directional controller arrangement wherein the electric motor may be selectively energized in opposite senses through an electrically operated sliding contact arrangement mounted in the motor housing.

It is another object of this invention to provide an improved unitary electric motor and bi-directional controller arrangement wherein the electric motor may be selectively energized in opposite senses through the operation of an electrically energizable device of the type that may be selectively rotated through opposite first and second angles of rotation in response to the electrical energization thereof in respective opposite senses that is mounted upon the motor housing and supports a disc member having two discrete circumferentially disposed electrically conductive areas separated by two discrete electrically insulating areas in axial alignment with the motor armature with each of the motor brushes being in sliding engagement with a surface of the disc and in contact with a respective one of the insulating areas when the disc is in a neutral position.

In accordance with this invention, a unitary electric motor and bi-directional controller arrangement is provided wherein the electrical energization of the motor armature may be effected in respective opposite senses through the operation of an electrically energizable device of the type that may be selectively rotated through opposite first and second angles of rotation in response to the electrical energization thereof in respective opposite senses that is mounted upon the motor housing and is arranged to support a disc member having two discrete circumferentially disposed electrically conductive areas separated by two discrete electrically insulating areas in axial alignment with the motor armature with each of the motor brushes being in sliding engagement with a surface of the disc and in contact with a respective one of the insulating areas when the disc member is in the neutral position.

For a better understanding of the present invention, together with additional objects, advantages and features thereof, reference is made to the following description and accompanying drawing in which:

FIG. 1 is an elevation view in section of the unitary electric motor and bi-directional controller arrangement of this invention;

FIG. 2 is a section view of FIG. 1 taken along line 2—2 and looking in the direction of the arrows;

FIG. 3 is a section view of FIG. 1 taken along line 3—3 and looking in the direction of the arrows;

FIG. 4 is a section view of FIG. 2 taken along line 4—4 and looking in the direction of the arrows; and FIG. 5 is a schematic diagram of the electrical circuit of FIG. 1.

In the several FIGURES of the drawing, like elements have been assigned like characters of reference.

The unitary electric motor and bi-directional controller arrangement of this invention provides for the energization of the motor armature in two opposite senses through an electrical contact arrangement in sliding arrangement with a surface of each of the motor brushes through which an external supply potential source may be applied across the motor armature.

In FIG. 1 of the drawing, a permanent magnet type direct current electric motor is shown in section and is generally referenced by the numeral 10. Motor 10 has an armature 11 that is electrically energizable through a commutator 12, a pair of brushes 13 and 14 each having a surface in sliding contact with commutator 12 and an annular housing 15. The commutator 12 end of annular housing 15 is enclosed by an annular end member 16 of an insulating material. Annular end member 16 may be mounted upon motor housing 15 by screws, two of which are referenced by the numerals 17 and 18, that extend through accommodating apertures in an annular mounting flange 19 and are threaded into corresponding threaded bores in annular end member 16. It is to be specifically understood that any suitable method or arrangement for securing annular end member 16 to motor housing 15 may be employed without departing from the spirit of the invention. Armature 11 is rotatably supported by motor housing 15 by bearings 20 and 21. Motor brushes 13 and 14 extend through suitable apertures in annular end member 16 with one end surface of each in sliding contact with the electrically conductive segments of commutator 12, two of which are referenced by the numerals 22 and 23. As is well known in the direct current electric motor art, the motor 10 magnetic field is provided by permanent magnets 24 and 25. Although motor commutator 12 is illustrated in FIG. 1 to be of the face type, it is to be specifically understood that other type commutator arrangements may be employed without departing from the spirit of the invention.

Also mounted upon motor housing 12 is an electrically energizable device generally referenced by the reference numeral 30. This device has an armature member 31 rotatably mounted upon the shaft 26 of motor 10 by a sleeve type bearing 32. Armature 31 is wound as any direct current motor armature may be wound and the magnetic field is supplied by permanent magnets 33 and 34 supported by annular housing 35. Annular housing 35 may be mounted upon motor housing 15 by screws, two of which are referenced by the numerals 36 and 37, that extend through accommodating apertures in an annular mounting flange 38 and are threaded into corresponding threaded bores in annular end member 16. Annular housing 35 may be mounted upon motor housing 15 in any other suitable manner without departing from the spirit of the invention.

Operationally supported by the electrically energizable device 30 is an oscillatory member 40 having two discrete circumferentially disposed electrically conductive areas 41 and 42, best seen in FIG. 2, separated by two discrete electrically insulating areas 43 and 44. Oscillatory member 40, illustrated in the drawing as a disc, may be operationally mounted upon armature 31 of the electrically energizable device 30 by cylindrical projections 45 and 46 that are carried by armature 31 and extend into accommodating bores in oscillatory member 40. Referring to FIG. 4 which is a section view of FIG. 2, oscillatory member 40 is shown to be made up of a substrate 47 of an electrical insulating material with the electrically conductive areas 41 and 42 secured to both opposite flat face surfaces thereof. The electrically conductive areas 41 and 42 are shown to extend along the top surface of substrate 47, to pass over the edge boundary and then extend along the bottom surface. It is to be specifically understood that other methods for providing electrically conductive areas 41 and 42 on both opposite flat face surfaces of substrate 47 may be employed without departing from the spirit of the invention.

To maintain armature 31 of the electrically energizable device 30 and, hence oscillatory member 40, in a neutral position, respective return springs 51 and 52, best seen in FIG. 3, are rigidly secured to end member 16. Return springs 51 and 52 are so located as to operatively engage a cam member 50 rigidly secured to armature 31 of electrically energizable device 30.

In a manner to be later explained, the operating member, armature 31, of electrically energizable device 30 may be actuated through selected opposite first and second directions of travel or rotation relative to a normal neutral position in response to the electrical energization of the electrically energizable device 30 through the windings of armature 31. When mounted as shown in the drawing, the electrically energizable device 30 includes an arrangement for supporting and normally maintaining oscillatory member 40 in a neutral position and is mounted upon motor housing 15 in such a manner that the motor armature 11 and the oscillatory member 40 are in axial alignment with a surface of each of the motor brushes 13 and 14 being in sliding engagement with a surface of oscillatory member 40.

A pair of electrical contact members 54 and 55, best seen in FIGS. 3 and 5, are arranged for electrical connection across an external potential source and are supported by the motor housing 15 in such a location and position that each is in sliding engagement with the surface area of oscillatory member 40 opposite that with which the motor brushes are in sliding engagement and is in electrical contact with a respective one of the electrically conductive areas 41 and 42 at all positions of oscillatory member 40 within the operating range thereof.

Referring to FIG. 5, a schematic diagram of the electrical circuitry of the controller arrangement of this invention is illustrated. Operating potential may be provided by a conventional storage battery 56 having the negative polarity output terminal thereof connected to point of reference or ground potential 5, illustrated by the accepted schematic symbol. To provide for the energization of armature 31 of electrically energizable device 30 in respective first and second senses, a conventional single pole-double throw electrical switch 60 of the spring return to neutral type having the movable contact 61 thereof connected to the positive polarity output terminal of battery 56 may be employed. One terminal end of armature winding 31A of armature 31 is connected to stationary contact 62 of switch 60, one terminal end of the other armature winding 31B of armature 31 is connected to stationary contact 63 of switch 60 and the opposite terminal end of each of these armature windings is connected to point of reference or ground potential 5. Electrical contact member 55 is connected to the positive polarity output terminal of battery 56 through lead 64 and electrical contact member 54 is connected through leads 65 and 66 to point of reference or ground potential 5. One armature winding 11A of armature 11 of motor 10 is illustrated in FIG. 5 to be connected across conductive commutator segments 22 and 23 of commutator 12. In the interest of reducing drawing complexity, only one of the armature 11 windings is illustrated in FIG. 5. It is to be specifically understood that armature 11 may have a selected number of other armature windings connected across corresponding conductive segments of commutator 12 in a manner well known in the electric motor art.

Upon the closure of movable contact 61 of switch 60 to stationary contact 62, battery 56 potential is applied across armature winding 31A of armature 31 through a circuit which may be traced from the positive polarity output terminal of battery 56, through lead 67, closed contacts 61 and 62 of switch 60, lead 68, armature winding 31A, leads 69 and 66 and a point of reference or ground potential 5 to the negative polarity output terminal of battery 56. Upon the completion of this energizing circuit, armature 31 rotates through an angle of rotation that, for purposes of this specification will be assumed to be in a clockwise direction, until the electrical field produced by this energization lines up with the magnetic field produced by permanent magnets 34 and 35 in a manner well known in the art. Rotated armature 31 operates oscillatory member 40 in a clockwise direction to a position in which brush 13 of motor 10 is in sliding contact engagement with electrically conductive area 42 and brush 14 of motor 10 is in sliding contact engagement with electrically conductive area 41. Rotated armature 31 also rotates cam member 50 in a clockwise direction to spread return springs 51 and 52. And this time, an electrical circuit is completed for armature winding 11A of armature 11 of motor 10 through a circuit that may be traced from the positive polarity output terminal of battery 56, through lead 64, electrical contact member 55, electrically conductive area 41 of oscillatory member 40, brush 14 of motor 10, conductive segment 23 of commutator 12, armature winding 11A, conductive segment 22 of commutator 12, motor brush 13, electrically conductive area 42 of oscillatory member 40, electrical contact member 54, leads 65 and 66 and point of reference or ground potential 5 to the negative polarity output terminal of battery 56. So long as movable contact 61 of switch 60 is maintained in electrical circuit closing engagement with movable contacts 62, motor 10 is energized through this circuit and armature 11 thereof rotates in a direction that for purposes of this specification will be assumed to be clockwise.

Upon the release of movable contact 61 from stationary contact 62, the previously described energizing circuit for armature winding 31A of armature 31 is interrupted. As a consequence, the force exerted by return springs 51 and 52 upon cam ember 50 produces a counterclockwise rotation of cam member 50 to return armature 31 and, as a consequence, oscillatory member 40 to the neutral position.

Upon the closure of movable contact 61 of switch 60 to stationary contact 63, battery 56 potential is applied across armature winding 31B of armature 31 through a circuit which may be traced from the positive polarity output terminal of battery 56, through lead 67, closed contacts 61 and 63 of switch 60, armature winding 31B, leads 70 and 66 and a point of reference or ground potential 5 to the negative polarity output terminal of battery 56. Upon the completion of this energizing circuit, armature 31 rotates through an angle of rotation that, for purposes of this specification will be assumed to be in a counterclockwise direction, until the electrical field produced by this energization lines up with the magnetic field produced by permanent magnets 33 and 34 in a manner well known in the art. Rotated armature 31 operates oscillatory member 40 in a counterclockwise direction to a position in which brush 13 of motor 10 is in sliding contact engagement with electrically conductive area 41 and brush 14 of motor 10 is in sliding contact engagement with electrically conductive area 42. Rotated armature 31 also rotates cam member 50 in a counterclockwise direction to spread return springs 51 and 52. At this time, an electrical circuit is completed for armature winding 11A of armature 11 of motor 10 through a circuit that may be traced from the positive polarity output terminal of battery 56, through lead 64, electrical contact member 55, electrically conductive area 41 of oscillatory member 40, brush 13 of motor 10, conductive segment 22 of commutator 12, armature winding 11A, conductive segment 23 of commutator 12, motor brush 14, electrically conductive area 42 of oscillatory member 40, electrical contact member 54, leads 65 and 66 and point of reference or ground potential 5 to the negative polarity output terminal of battery 56. So long as movable contact 61 of switch 60 is maintained in electrical circuit closing engagement with movable contacts 63, motor 10 is energized through this circuit and armature 11 thereof rotates in a direction for purposes of this specification will be assumed to be counterclockwise.

Upon the release of movable contact 61 from stationary contact 63, the previously described energizing circuit for armature winding 31B of armature 31 is interrupted. As a consequence, the force exerted by return springs 51 and 52 upon cam member 50 produces a counterclockwise rotation of cam member 50 to return armature 31 and, as a consequence, oscillatory member 40 to the neutral position.

Electrical switch 60 of FIG. 5 of the drawing illustrates only one switching arrangement for the windings 31A and 31B of armature 31. It is to be specifically understood that other switching arrangements and devices may be employed without departing from the spirit of the invention.

From the description it is apparent that oscillatory member 40 has two discrete circumferentially disposed electrically conductive areas 41 and 42 separated by two discrete electrically insulating areas 43 and 44; is arranged to be operated by a motor housing 15 mounted electrically energizable operating device 30 through opposite first and second angles of rotation relative to a normal neutral position in response to the electrical energization of the operating device in respective opposite senses; is mounted in axial alignment with the armature 11 of motor 10 and is so located and positioned that a surface of each of brushes 13 and 14 of motor 10 is in sliding engagement with a surface thereof, is in contact with a respective one of the electrically insulating areas 43 and 44 when the oscillatory member 40 is in a neutral position, is in contact with one of the electrically conductive areas 41 and 42 when the oscillatory member 40 is operated through one angle of rotation and is in contact with the other one of the electrically conductive areas 41 and 42 when the oscillatory member 40 is operated through the other one of the angles of rotation. Further, it is also apparent that the pair of electrical contact members 54 and 55 are arranged for electrical connection across an external potential source and are supported by the housing 15 of motor 10 in such a location and position that each is in sliding engagement with a surface of oscillatory member 40 and is in contact with a respective one of the electrically conductive areas 41 and 42 at all positions of oscillatory member 40 within the operating range thereof whereby motor armature 11 of motor 10 is conditioned for electrical energization in respective opposite senses in response to the operation of oscillatory member 40 through a first angle of rotation and through a second angle of rotation.

While a preferred embodiment of the present invention has been shown and described, it will be obvious to those skilled in the art that various modifications and substitutions may be made without departing from the spirit of the invention which is to be limited only within the scope of the appended claims.

The embodiments of the invention in which an exclusive property or privilege is claimed are defined as follows:

1. A unitary electric motor and bi-directional controller arrangement comprising:
    an electric motor having an armature electrically energizable through a commutator, a pair of brushes each having a surface in sliding contact with said commutator and a housing including means for rotatably supporting said armature;
    electrically energizable means of the type having an operating member that may be actuated through selected opposite first and second directions of travel relative to a normal neutral position in response to the electrical energization of said electrically energizable means in respective opposite senses mounted upon said motor housing; and
    means actuated by said operating member and so positioned as to be in sliding contact with another surface of each of said motor brushes for completing first and second electrical circuits through which the electrical energization of said motor armature may be effected in respective opposite senses in response to the operation of said operating member through said first direction of travel and through said second direction of travel upon the energization of said electrically energizable means in responsive opposite senses.

2. A unitary electric motor and bi-directional controller arrangement comprising:
    an electric motor having an armature electrically energizable through a commutator, a pair of brushes each having a surface in sliding contact with said commutator and a housing including means for rotatably supporting said armature;

an oscillatory member having two discrete circumferentially disposed electrically conductive areas separated by two discrete electrically insulating areas;

electrically energizable means including means for supporting said oscillatory member and means for normally maintaining said oscillatory member in a neutral position mounted upon said motor housing in such a manner that said motor armature and said oscillatory member are in axial alignment with another surface of each of said motor brushes being in sliding engagement with a surface of said oscillatory member and in contact with a respective one of said insulating areas when said oscillatory member is in said neutral position, said electrically energizable means being arranged to effect the operation of said oscillatory member through selected opposite first and second angles of rotation relative to said neutral position in response to the electrical energization thereof in respective opposite senses; and circuit means including said oscillatory member through which the electrical energization of said motor armature may be effected in respective opposite senses in response to the operation of said oscillatory member through said first angle of rotation and through said second angle of rotation upon the energization of said electrically energizable means in respective opposite senses.

3. A unitary electric motor and bi-directional controller arrangement comprising:

an electric motor having an armature electrically energizable through a commutator, a pair of brushes each having a surface in sliding contact with said commutator and a housing including means for rotatably supporting said armature;

a disc member having two discrete circumferentially disposed electrically conductive areas separated by two discrete electrically insulating areas arranged to be operated by a motor housing mounted electrically energizable operating device through opposite first and second angles of rotation relative to a normal neutral position in response to the electrical energization of said operating device in respective opposite senses, said disc member being mounted in axial alignment with said motor armature and being so located and positioned that another surface of each of said motor brushes is in sliding engagement with a surface thereof, is in contact with a respective one of said electrically insulating areas when said disc member is in said neutral position, is in contact with one of said electrically conductive areas when said disc member is operated through one of said angles of rotation and is in contact with the other one of said electrically conductive areas when said disc member is operated through the other one of said angles of rotation; and a pair of electrical contact members arranged for electrical connection across a potential source and supported by said motor housing in such a location and position that each is in sliding engagement with a surface of said disc member and is in contact with a respective one of said electrically conductive areas at all positions of said disc member within the operating range thereof whereby said motor armature is conditioned for electrical energization in respective opposite senses in response to the operation of said disc member through said first angle of rotation and through said second angle of rotation.

* * * * *

UNITED STATES PATENT AND TRADEMARK OFFICE
CERTIFICATE OF CORRECTION

PATENT NO. : 4,232,256
DATED : November 4, 1980
INVENTOR(S) : Leonard E. Moriconi, Yoshitaka Yoshida It is certified that error appears in the above—identified patent and that said Letters Patent is hereby corrected as shown below:

Column 2, line 26, "arrangement" should read -- engagement --.

Column 4, line 51, "And" should read -- At --.

Column 5, line 5, "ember" should read -- member --.

Column 6, line 63, "responsive" should read -- respective --.

Signed and Sealed this

Seventeenth Day of February 1981

[SEAL]

Attest:

RENE D. TEGTMEYER

Attesting Officer     Acting Commissioner of Patents and Trademarks